No. 793,600.

Patented June 27, 1905.

UNITED STATES PATENT OFFICE.

WALTHER MÖLLER-HOLTKAMP, OF MÜNCHEN-GLADBACH, GERMANY.

PROCESS OF MANUFACTURING SIZE.

SPECIFICATION forming part of Letters Patent No. 793,600, dated June 27, 1905.

Application filed April 28, 1904. Serial No. 205,379.

*To all whom it may concern:*

Be it known that I, WALTHER MÖLLER-HOLTKAMP, referendary, residing at München-Gladbach, Germany, have invented certain new and useful Improvements in Processes for the Manufacture of Size for Cotton Yarn, of which the following is a full, clear, and exact specification.

In weaving it is well known that cotton thread in its natural condition does not meet the demands made upon its strength and elasticity. For this reason many experiments have been made to strengthen the thread by the so-called "size" treatment. This process generally consists in impregnating the thread with a sticky substance usually composed of a solution of potato or wheaten flour and water, the adhesive power of which is considerably increased by an admixture of glue. Some firms produce their size in the way of dissolving the starch contained in any kind of flour by the use of a solution of caustic potash or sodium hydrate.

To the present day the manufacture of size that is faultless in every respect has not been achieved, a fact which is proved by the new recipes for size and size admixture that are being constantly introduced into the market at high prices; but the expenditure does not end with the initial cost of the recipes, for as the size produced by their means is generally in the form of a creamy lumpy kind of mess—that is to say, too much potato-flour in an undissolved state is contained in it—considerable additional expenses are incurred in the preparation of the yarn. Even the little-used sort of size manufactured in the cold way by the action of a solution of caustic potash or sodium hydrate on flour cannot be regarded as perfect, as by this chemical process not all the starch contained in the flour is fully utilized. A perfectly faultless size, however, is obtained by the following process: Put fifteen pounds of potato-flour into from ten to fifteen liters of cold water. The mass is then made uniform by continuously stirring it and crushing any little lumps that might have formed, after which it is poured into a bath of about one hundred and fifty liters of water (taking into consideration the ten or fifteen liters already used) and brought to boiling temperature by the admission of steam to it while being constantly stirred. This mixture gradually becomes so thick that a further stirring of the same will be found impossible. At this moment a solution of about four hundred to five hundred grams ten-per-cent. chlorid of lime, with about five or six liters of water, is added and the bath allowed to thoroughly boil. In seven or nine minutes after the lime chlorid has been added and the mass itself well stirred the latter becomes a thin fluid clear as water, in which state it may be used at a temperature of from 50° to 60° Celsius for sizing purposes.

The watery solution of chlorid of lime, which, as is well known consists of caustic lime, $Ca(OH)_2$, chlorid of calcium, $(CaCl_2,)$ and calcium hypochlorite, $Ca(OCl)_2$, has a double effect upon the starch, (potato-flour.) Chlorid of lime and chylorid of calcium produce a mechanical solution of the starch, and calcium hypochlorite, a very powerful agent in oxidation, effects a change from starch to sugar and finally to gluconic acid. A solution of chlorid of lime can only be partly substituted by caustic potash or sodium hydrate, as the latter two only effect a solution of the starch and not a change into gluconic acid.

If the thread is treated with this size, it will be completely impregnated on account of the thin liquid state of the size, and as the starch is entirely dissolved no traces of any remaining undissolved particles on the surface of the thread are to be found. Moreover, the yarn is of a strength as no other size will yield. From this it follows that these essential savings are due solely to the fact that not the least part of the flour is wasted, while the application of size manufactured by the process described has proved most successful.

Having thus fully described my invention, what I claim as new, and desire to secure by Letters Patent of the United States, is—

Process for the manufacture of a size, clear as water, for cotton thread, which consists in working potato-flour with water into a uniform paste, then diluting in about ten times its volume of water, then boiling till thick, then adding a watery solution of chlorid of lime and finally reboiling, substantially as described.

In testimony whereof I affix my signature.

WALTHER MÖLLER-HOLTKAMP.

In presence of—
 OSKAR KÜNZELL,
 PETER LIEBER.